(12) United States Patent
Linsky et al.

(10) Patent No.: US 10,015,302 B2
(45) Date of Patent: Jul. 3, 2018

(54) DISCOVERY OF AND COMMUNICATION WITH TRUSTED DEVICES

(71) Applicant: QUALCOMM Incorporated, San Diego, CA (US)

(72) Inventors: Joel Benjamin Linsky, San Diego, CA (US); Robin Heydon, Cambridge (GB); Brian Arnold Redding, Urbana, IL (US); Mayank Batra, Cambridge (GB); Christopher Church, Cambridge (GB)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 15/272,859

(22) Filed: Sep. 22, 2016

(65) Prior Publication Data
US 2018/0084097 A1 Mar. 22, 2018

(51) Int. Cl.
| | |
|---|---|
| *H04M 1/725* | (2006.01) |
| *H04W 8/00* | (2009.01) |
| *H04W 76/04* | (2009.01) |
| *H04L 29/06* | (2006.01) |
| *H04W 12/04* | (2009.01) |
| *H04W 76/28* | (2018.01) |
| *H04W 12/00* | (2009.01) |

(52) U.S. Cl.
CPC ...... *H04M 1/7253* (2013.01); *H04L 63/0428* (2013.01); *H04L 63/06* (2013.01); *H04W 8/005* (2013.01); *H04W 12/04* (2013.01); *H04W 76/048* (2013.01); *H04W 76/28* (2018.02); *H04W 12/00* (2013.01)

(58) Field of Classification Search
CPC ...... H04W 76/023; H04W 12/00; H04L 9/00; H04M 1/7253
See application file for complete search history.

(56) References Cited

U.S. PATENT DOCUMENTS

| | | | |
|---|---|---|---|
| 6,414,964 B1 * | 7/2002 | Holmquist | .............. H04L 41/00 370/449 |
| 7,689,169 B2 | 3/2010 | Lee et al. | |
| 8,462,651 B1 | 6/2013 | Singh et al. | |
| 8,737,917 B2 | 5/2014 | Desai et al. | |
| 8,744,351 B2 | 6/2014 | Kapur et al. | |
| 9,198,212 B2 * | 11/2015 | Yee | ..................... H04W 76/023 |

(Continued)

FOREIGN PATENT DOCUMENTS

WO 2016126531 A1 8/2016

OTHER PUBLICATIONS

International Search Report and Written Opinion—PCT/US2017/047930—ISA/EPO—dated Nov. 22, 2017.

*Primary Examiner* — Cindy Trandai
(74) *Attorney, Agent, or Firm* — Muncy, Geissler, Olds & Lowe, P.C./QualComm

(57) ABSTRACT

Systems and methods are directed to discovering trusted remote devices and establishing trusted communications with trusted remote devices. A local device can determine one or more time periods of expected silence in a communication between the local device and a remote device; and embed trusted communication messages in the one or more time periods for at least one of: discovering that the remote device is a trusted remote device, performing a trusted communication with the trusted remote device. The communication may be based on a Bluetooth protocol in a link layer.

24 Claims, 10 Drawing Sheets

(56) References Cited

U.S. PATENT DOCUMENTS

| | | |
|---|---|---|
| 9,219,987 B2 | 12/2015 | Ghosh et al. |
| 9,338,638 B1 | 5/2016 | Palin et al. |
| 2008/0027587 A1* | 1/2008 | Nickerson ............... A01G 25/16 700/284 |
| 2012/0269250 A1 | 10/2012 | Li et al. |
| 2013/0003715 A1* | 1/2013 | Xhafa ............... H04W 52/0229 370/349 |
| 2013/0109323 A1* | 5/2013 | Ruutu ................. H04B 5/0031 455/68 |
| 2013/0188538 A1* | 7/2013 | Kainulainen ............. G01S 3/48 370/310 |
| 2014/0254466 A1* | 9/2014 | Wurster ............... H04L 12/189 370/312 |
| 2014/0282974 A1 | 9/2014 | Maher et al. |
| 2014/0357194 A1* | 12/2014 | Jin ....................... H04W 8/005 455/41.2 |
| 2014/0378057 A1* | 12/2014 | Ramon .................... H04L 9/32 455/41.2 |
| 2015/0133170 A1* | 5/2015 | Buchheim ............. H04W 4/023 455/456.5 |
| 2015/0215775 A1* | 7/2015 | Burch ................... H04W 12/04 713/150 |
| 2015/0230285 A1* | 8/2015 | Park .................... H04W 76/028 455/41.2 |
| 2016/0007181 A1* | 1/2016 | Palin .................... H04W 8/005 455/41.2 |
| 2016/0028726 A1 | 1/2016 | Matthews et al. |
| 2016/0072855 A1* | 3/2016 | Palin .................. H04L 65/1069 709/219 |
| 2016/0183090 A1* | 6/2016 | Knaappila ............. H04W 12/06 726/7 |
| 2016/0212194 A1* | 7/2016 | Palin .................... G06F 3/0484 |
| 2016/0286341 A1* | 9/2016 | Lee .................... H04W 76/023 |

* cited by examiner

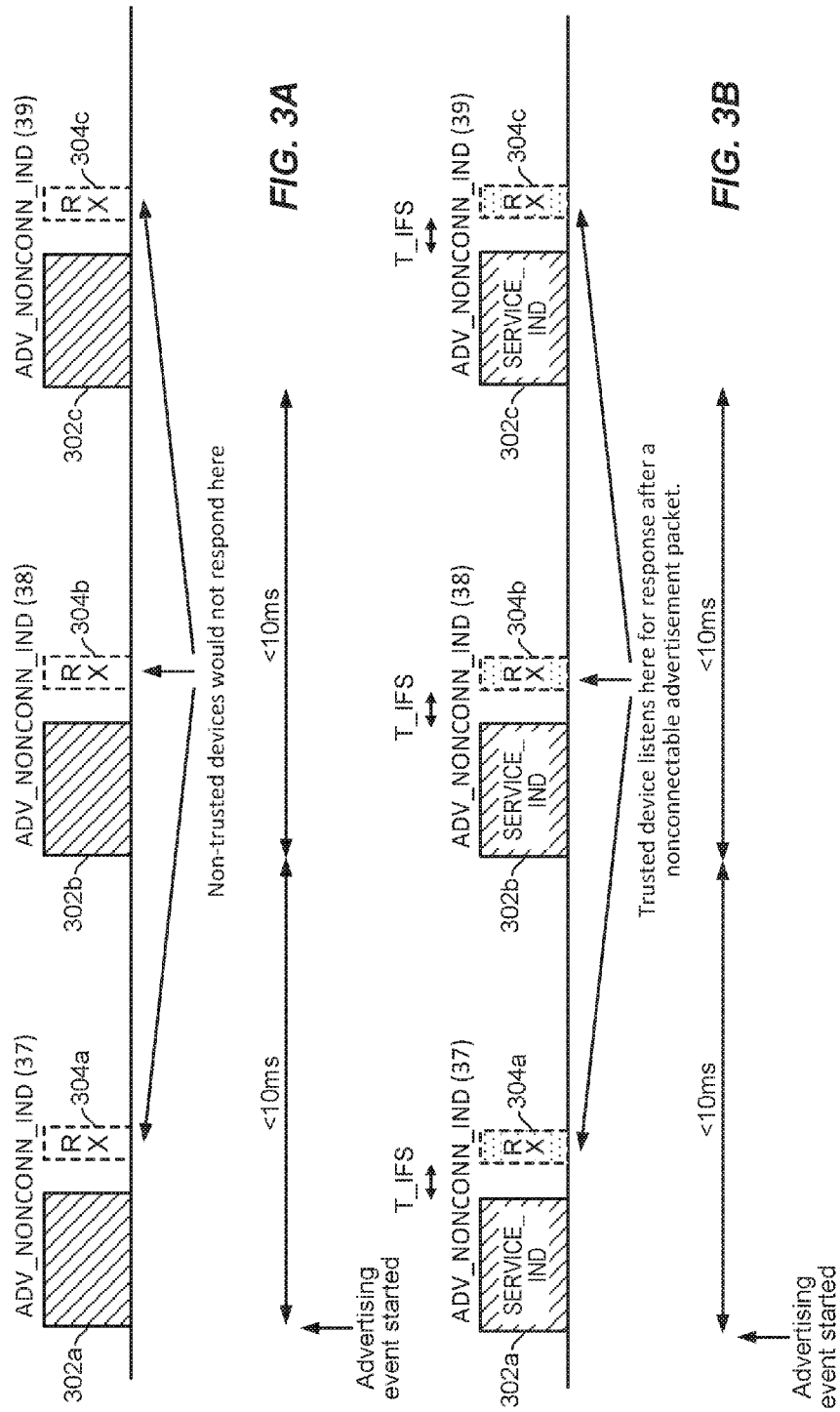

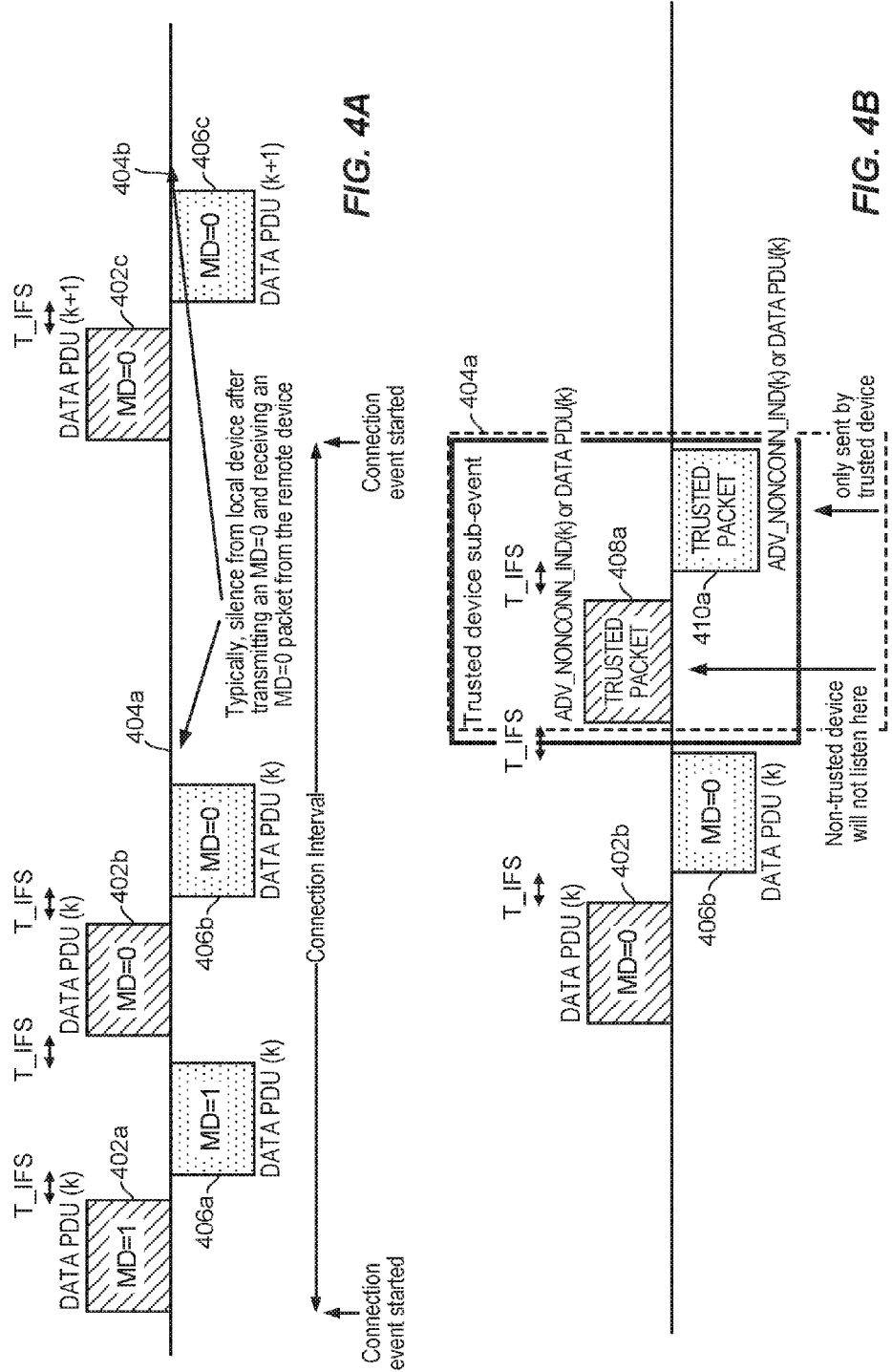

DISCOVERY OF AND COMMUNICATION WITH TRUSTED DEVICES

FIELD OF DISCLOSURE

Disclosed aspects are related to wireless communications. More specifically, exemplary aspects are related to discovering or detecting trusted remote devices and/or establishing secure peer-to-peer communication with trusted remote devices wherein the devices may be compatible with wireless communication according to standards such as Bluetooth, Bluetooth Low Energy (BLE), etc.

BACKGROUND

Wireless communication may follow the well-known seven layer open system interconnection (OSI) model, which is a conceptual model for standardizing telecommunication systems across various infrastructures and operating technologies, to provide interoperability. The seven layers include: a physical layer (layer 1) which defines electrical and physical specifications for underlying data connections and provides a relationship between hardware and a physical transmission medium; a data link layer (layer 2), which provides node to node data transfer between two connected nodes in the system, and may also be used for error correction in the physical layer; a network layer (layer 3), which provides a functional and procedural means for transferring data sequences (e.g., of variable length) between the nodes which form a network; a transport layer (layer 4), which provides means for transporting the data sequences from a source to a destination across one or more networks in the underlying layer; a session layer (layer 5) which provides controls or connections e.g., full-duplex, half-duplex, etc., between different processors; a presentation layer (layer 6) for establishing communication context between different applications or entities which may use different semantics of mappings between them; and an application layer (layer 7) which is closest to an end user, and provides an interface to a user or software.

Specifically, for wireless communication technologies such as Bluetooth, BLE, etc., the data link layer (layer 2) or simply, the "link layer" as well as the applications layer (layer 7) may be configured for enabling peer-to-peer wireless communication between two compatible wireless devices. Without loss of generality, a first wireless device of the two wireless devices may be considered as a local device while a second wireless device of the two wireless devices may be considered as a remote device. In some cases, the local device may wish to authenticate the remote device as a trusted device before communicating with the remote device, or more specifically, before establishing proprietary or secure communication with the remote device. For example, the remote device may be a trusted remote device if the remote device and the local device share one or more predetermined root keys associated with one or more subsystems (e.g., a bootloader, firmware, digital signal processor (DSP)). The local and remote devices may share root keys if they have a common manufacturer, are designed under a common or shared license, share proprietary hardware, etc. The local device and remote device may be in a position to exchange proprietary information which may relate to or affect their underlying proprietary hardware, software, or a combination thereof, if a trust is established between them.

However, the wireless communication established and maintained by the link layer and the applications layers may not be secure enough to share proprietary information over the air (OTA) by means of existing wireless communication. This is because the applications layer, for example, may run any third-party software used in the discovery and exchange of information used in establishing and maintaining a Bluetooth communication between the local and remote devices, and using the existing Bluetooth communication to send or receive proprietary information may expose the underlying physical layer or hardware to security threats.

Therefore, there is a need in the field of peer-to-peer wireless communications for discovering trusted remote devices and enabling trusted communication between trusted remote devices.

SUMMARY

Exemplary aspects are directed to systems and methods for discovering trusted remote devices and establishing trusted communications with trusted remote devices. A local device can determine one or more time periods of expected silence in a communication between the local device and a remote device; and embed trusted communication messages in the one or more time periods for at least one of: discovering that the remote device is a trusted remote device or performing a trusted communication with the trusted remote device. The communication may be based on a Bluetooth protocol in a link layer. In one aspect the communication comprises an advertising establishment bearer, wherein the one or more time periods follow one or more non-connectable advertising packets sent from the local device to the remote device and, wherein a non-trusted remote device does not provide a response to the one or more non-connectable advertising packets in the one or more time periods following the non-connectable advertisement packets. In another aspect the communication comprises a connection establishment bearer and wherein the one or more time periods follow one or more packet exchanges between the local device and the remote device to indicate that an existing conversation has ended.

For example, an exemplary aspect is directed to trusted communication method comprising determining one or more time periods of expected silence in a communication between a local device and a remote device, and embedding trusted communication messages in the one or more time periods for at least one of: discovering that the remote device is a trusted remote device, performing a trusted communication with the trusted remote device.

Another exemplary aspect is directed to communication system comprising a local device configured to determine one or more time periods of expected silence in a communication between the local device and a remote device, and embed trusted communication messages in the one or more time periods to at least one of: discover that the remote device is a trusted remote device or perform a trusted communication with the trusted remote device.

Yet another exemplary aspect is directed to communication system comprising means for determining one or more time periods of expected silence in a communication between the local device and a remote device, and means for embedding trusted communication messages in the one or more time periods to at least one of: discover that the remote device is a trusted remote device or perform a trusted communication with the trusted remote device.

BRIEF DESCRIPTION OF THE DRAWINGS

The accompanying drawings are presented to aid in the description of aspects of the disclosure and are provided solely for illustration and not limitations thereof.

FIGS. 3A-D illustrate aspects of establishing a trusted communication in the context of an advertising establishment bearer, between a local device and a trusted remote device, according to an aspect of this disclosure.

FIGS. 4A-C illustrate aspects of establishing a trusted communication in the context of a connection establishment bearer, between a local device and a trusted remote device, according to an aspect of this disclosure.

DETAILED DESCRIPTION

Figure 1:
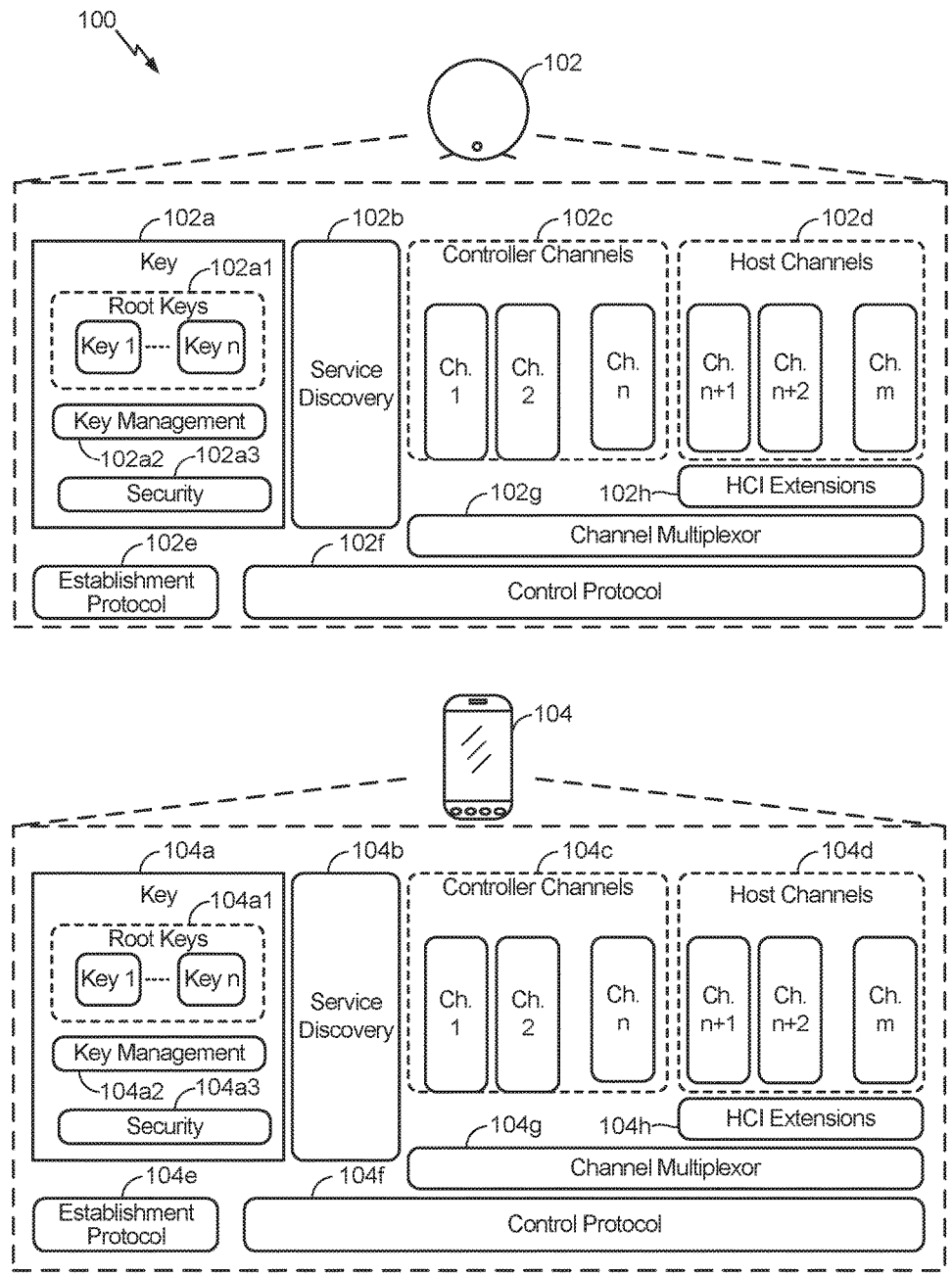
FIG. 1 illustrates a local device and a remote device in wireless communication, according to an aspect of this disclosure.

Specific examples of the disclosure are described in the following description and related drawings. Alternate examples may be devised without departing from the scope of the disclosure. Additionally, well-known elements will not be described in detail or will be omitted so as not to obscure the relevant details of the disclosure.

The word "exemplary" is used herein to mean "serving as an example, instance, or illustration." Any aspect described herein as "exemplary" is not necessarily to be construed as preferred or advantageous over other aspects. Likewise, the term "aspects" does not require that all aspects include the discussed feature, advantage, or mode of operation.

The terminology used herein is for the purpose of describing particular aspects only and is not intended to be limiting of the aspects. As used herein, the singular forms "a," "an," and "the" are intended to include the plural forms as well, unless the context clearly indicates otherwise. It will be further understood that the terms "comprises," "comprising," "includes," or "including," when used herein, specify the presence of stated features, integers, steps, operations, elements, or components, but do not preclude the presence or addition of one or more other features, integers, steps, operations, elements, components, or groups thereof. Moreover, it is understood that the word "or" has the same meaning as the Boolean operator "OR," that is, it encompasses the possibilities of "either" and "both" and is not limited to "exclusive or" ("XOR"), unless expressly stated otherwise. It is also understood that the symbol "/" between two adjacent words has the same meaning as "or" unless expressly stated otherwise. Moreover, phrases such as "connected to," "coupled to," or "in communication with" are not limited to direct connections unless expressly stated otherwise.

Further, many aspects are described in terms of sequences of actions to be performed by, for example, elements of a computing device. It will be recognized that various actions described herein can be performed by specific circuits, for example, central processing units (CPUs), graphic processing units (GPUs), digital signal processors (DSPs), application-specific integrated circuits (ASICs), field programmable gate arrays (FPGAs), or various other types of general purpose or special purpose processors or circuits, by program instructions being executed by one or more processors, or by a combination of both. Additionally, the sequence of actions described herein can be considered to be embodied entirely within any form of computer-readable storage medium having stored therein a corresponding set of computer instructions that upon execution would cause an associated processor to perform the functionality described herein. Thus, the various aspects of the disclosure may be embodied in a number of different forms, all of which have been contemplated to be within the scope of the claimed subject matter. In addition, for each of the aspects described herein, the corresponding form of any such aspects may be described herein as, for example, "logic configured to" perform the described action.

Exemplary aspects of this disclosure pertain to peer-to-peer wireless communication, e.g., based on technology, standards, or protocols such as Bluetooth, BLE, etc. An exemplary aspect is directed to discovering or detecting trusted remote devices. Another exemplary aspect is directed to establishing and performing proprietary or trusted communication with trusted remote devices. The above exemplary aspects may be implemented in a link layer which is modified from existing or conventional link layers as applicable to wireless communication between two wireless devices such as a local device (or host) and a remote device, keeping in mind that such identifiers are not absolute but may be relative to specific communications (e.g., the same device may be configured as a local or a slave in different scenarios).

In some aspects, trust may be established by modifications to existing protocols in the link layer. For example, time slots or periods in which a conventional protocol would require silence or no communication between the two wireless devices are identified. Proprietary communication may be performed in these identified time slots, wherein the proprietary communication includes: discovery of trusted remote devices, e.g., performed by proprietary information broadcasts or message exchanges which are transparent to non-trusted remote devices; and/or side channel communication, e.g., performed in a side channel path established between two wireless devices which may already be in an existing non-proprietary wireless communication. Identifying the time slots for proprietary communication in this manner may be dependent on the specific protocols or standards, and the following description provides example aspects in this regard, keeping in mind that the techniques described herein may be extended to any protocol and as such, are not limited to the ones described below.

Figure 2:
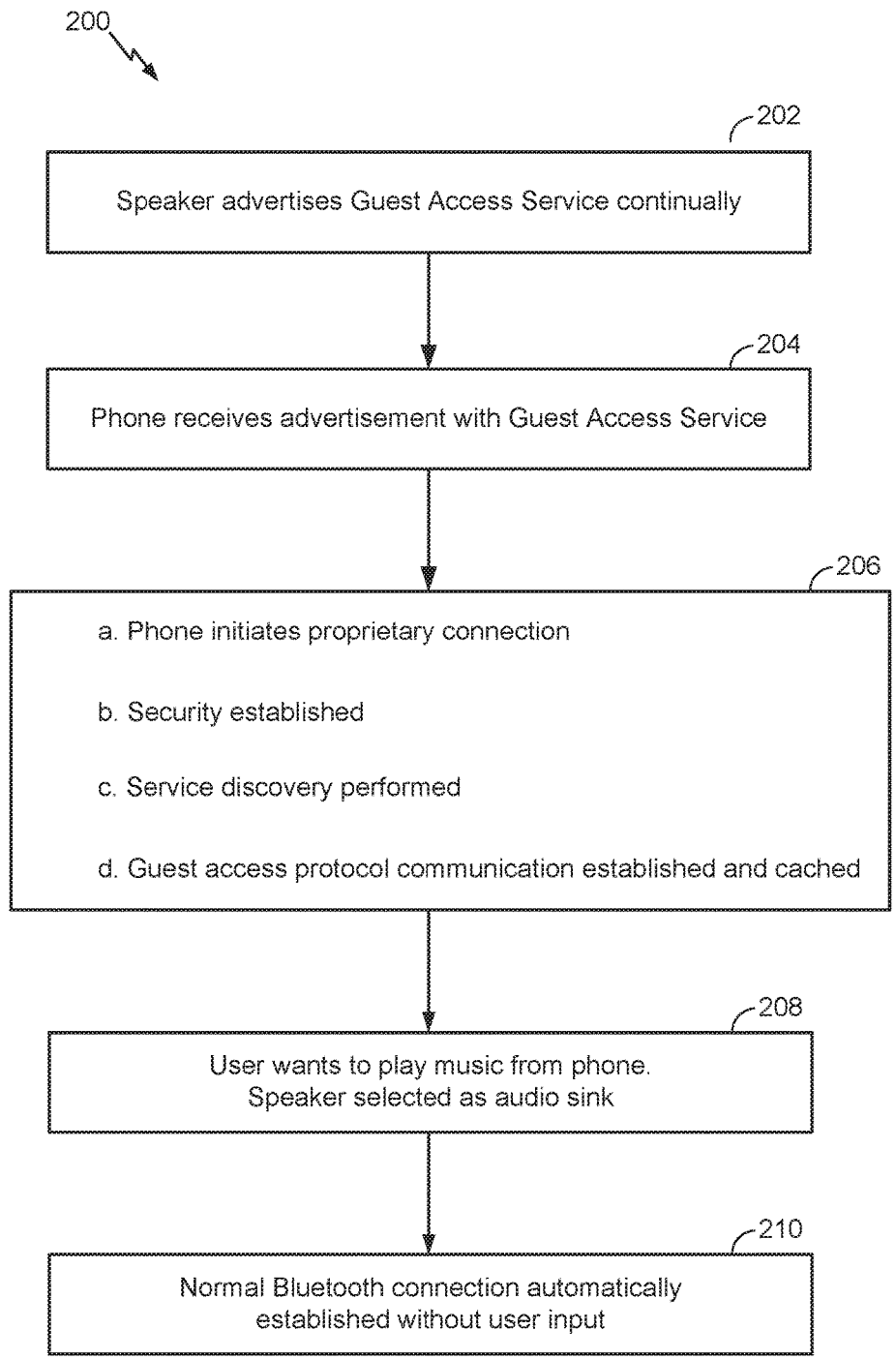
FIG. 2 illustrates a sequence of events for establishing a Bluetooth connection between a local device and a remote device.

With reference to FIGS. 1-2, an example operation of exemplary features will first be explained. In FIG. 1, two wireless devices, a Bluetooth speaker 102 and a mobile phone 104 are shown. In some examples, speaker 102 may be a remote device and phone 104 may be a local, while in other cases, the designations of local and remote may be switched. Thus, although examples will be described with one device described as a local device, host device, master device, etc., and another as a remote device, slave device, etc., it will be understood that these designations are merely for the sake of describing exemplary aspects and not intended as limitations; as such, designations of local and remote may be relative to the type of communication or direction of communication in some aspects. Accordingly, in one example, proprietary communication between speaker 102 (remote device) and phone 104 (local device) can be based on the communication layers illustrated for speaker 102 and phone 104.

FIG. 2 illustrates a sequence of interactions 200 between speaker 102 and phone 104 to establish a proprietary communication between the two devices. In an aspect, establishing such a proprietary communication may enable phone 104 to play music via speaker 102 through a Bluetooth connection, without having to perform a conventional Bluetooth pairing operation. Although phone 104 may be able to establish a conventional Bluetooth connection with speaker 102 via conventional pairing protocols, such pairing protocols may require transfer of sensitive information through third-party programs or applications (e.g., running on phone 104 and/or speaker 102 to facilitate the Bluetooth connection). Accordingly, conventional pairing protocols may expose the underlying hardware or physical layer of phone 104 (and/or speaker 102) to security threats or malware which may be introduced through the third-party programs. In scenarios where speaker 102 and phone 104 trust one another or are trusted remote devices which share a proprietary key (e.g., a hardware/software security key or password, illustrated as the blocks labeled key 102a in speaker 102 and key 104a in phone 104 in FIG. 1), for example, the exemplary sequence of interactions 200 may be used to establish a proprietary communication between the two devices and thereafter proceed to use the Bluetooth connection to transfer music from phone 104 to speaker 102 without risk of exposing phone 104 to malware, for example.

Returning to FIG. 1, exemplary components of speaker 102 and phone 104 which may be utilized the exemplary communication between speaker 102 and phone 104 are illustrated. The configuration of speaker 102 and phone 104 shown in FIG. 1 may form a modified link layer (or involve extensions to an existing link layer (layer 2)) in the context of the previously described Open Systems Interconnection (OSI) model, e.g., as applicable to Bluetooth communications. In some cases, the configuration of speaker 102 and phone 104 may also involve modifications an existing application layer (layer 7), referred to as a Host Controller Interface (HCl) in this context.

In more detail, speaker 102 and phone 104 are shown to comprise the following blocks which may support enhancements to the link layer to enable exemplary trusted communication in one aspect. Key 102a of speaker 102 and key 104a of phone 104 may include one or more respective root keys 102a1 and 104a1 (e.g., shown as keys 1-n), etc., (wherein, as previously mentioned, the keys may represent a shared secret between trusted devices). Key management blocks 102a2 and 104a2 may respectively manage root keys 102a1 and 104a1. Security blocks 102a3 and 104a3 may respectively be configured to authenticate, e.g., in conjunction with key management blocks 102a2 and 104a2, keys of proprietary devices.

Each of speaker 102 and phone 104 may have multiple channels through which they may send and receive communications. As such, speaker 102 may communicate on one or more controller channels 102c and/or one or more host channels 102d, wherein channel multiplexor 102g may be used for multiplexing among these various host/controller channels. Similarly, phone 104 may communicate on one or more controller channels 104c and/or one or more host channels 104d, wherein channel multiplexor 104g may be used for multiplexing among these various host/controller channels. Channel multiplexors 102g and 104g may also respectively provide a link to higher level communication protocols between multiple devices. In one example, proprietary features in the physical layer or hardware (e.g., silicon integration) related to the proprietary link layer may be routed through control channels 102c/104c and host channels 102d/104d respectively by channel multiplexors 102g/104g. In some aspects, channel multiplexors 102g/104g may also provide a path to the extensions or modifications to the Host Control Interface shown as HCl extensions 102h and 104h respectively for speaker 102 and phone 104.

The blocks shown as Establishment Protocol 102e and 104e may be used to advertise proprietary or trusted services, authenticate a peer device, initiate a trusted connection with peer device, etc. The blocks shown as Control Protocol 102f and 104f may be used to manage proprietary connections with a peer device. The blocks shown as Service Discovery 102b and 104b may be configured to discover proprietary features, which can use a dedicated channel in the Host Controller Interface (HCl).

Referring once again to FIG. 2, in Step 202, speaker 102 can advertise a proprietary service for remote access, referred to as a Guest Access Service, continually, based on the Establishment Protocol managed by Establishment Protocol block 102e.

In Step 204, phone 104 may receive the advertisement of the Guest Access Service. For example, one of the host channels 104d (e.g., channel n+1) of phone 104 may lock on to the advertisement transmitted by speaker 102.

Step 206 involves determining whether speaker 102 is a trusted remote device of phone 104. Step 206 is broken down into four parts: 206a-d and will be explained as follows. In Step 206a, phone 104 may initiate a proprietary connection through Establishment Protocol blocks 102e and 104e, respectively, of phone 104 and speaker 102. In Step 206b, security is established by respective Security blocks 102a3 and 104a3, using, for example, key blocks 102a and 104a (or more specifically, the root keys 102a1 and 104a1 of phone 104 and speaker 102, respectively). In Step 206c, Service Discovery blocks 102b and 104b are used between phone 104 and speaker 102 to discover the services that may be provided by speaker 102 to phone 104. In Step 206d, a guest access protocol for communication between speaker 102 and phone 104 may be established and cached. For example, channel n+1 (representing a frequency band, for example), of host channels 102d and 104d, respectively, of speaker 102 and phone 104, may be selected and corresponding device addresses of speaker 102 and phone 104 may be exchanged so that future inquiry can be avoided. A temporary session key can also be exchanged so that a key for conventional pairing will not be necessary for establishing the Bluetooth connection. At the end of Step 206, speaker 102 can be established as a trusted remote device of phone 104.

In Step 208, a user of phone 104 may select speaker 102 as an audio sink to play music from phone 104, and subsequently in Step 210, a normal or regular Bluetooth connection between phone 104 and speaker 102 may be automatically established, e.g., encrypted with the temporary session key exchanged in Step 206d, without specific user input or pairing processes.

Accordingly, using the exemplary techniques, the proprietary communication channel between speaker 102 and phone 104 can avoid exchange of sensitive information over insecure communication channels such as traditional Bluetooth pairing mechanisms. In other examples, the exemplary techniques may also be used in situations wherein a local device such as phone 104 may manage a remote device such as speaker 102 in a manner which is compatible with Bluetooth standards, yet maintain an additional layer of security or trust. For example, through the proprietary communication channel, phone 104 may provision speaker 102, perform one or more firmware status updates or version checks on speaker 102, provide over the air (OTA) updates to speaker 102, send messages for quarantining at least portions or sections of the trusted remote device such as speaker 102 (e.g., if it is discovered that speaker 102 is affected by malware, phone 102 may quarantine affected sections without allowing the malware to affect phone 102), perform diagnostics on speaker 102, etc. Further, the proprietary communication channel may also be used in proprietary services, such as the above described advertisements of Guest Access Service, providing authentications for enabling proprietary coder-decoder (codecs), configuring discontinuous transmissions (DTX), negotiations of master-slave roles or designations of local/remote devices, as previously mentioned, or combinations thereof.

The following sections will now provide more details on the discovery of trusted remote devices and communication through proprietary side channels with trusted remote devices. The proprietary communication connection is also referred to as a "bearer". Two types of bearers will now be described. A first is an advertising establishment bearer, used, for example, in discovering trusted remote devices which may be within the range of Bluetooth communication with a local device. A second is a connection establishment bearer used, for example, to provide or overlay a side channel communication on an existing Bluetooth connection between a local device and a remote device.

Figure 3C:
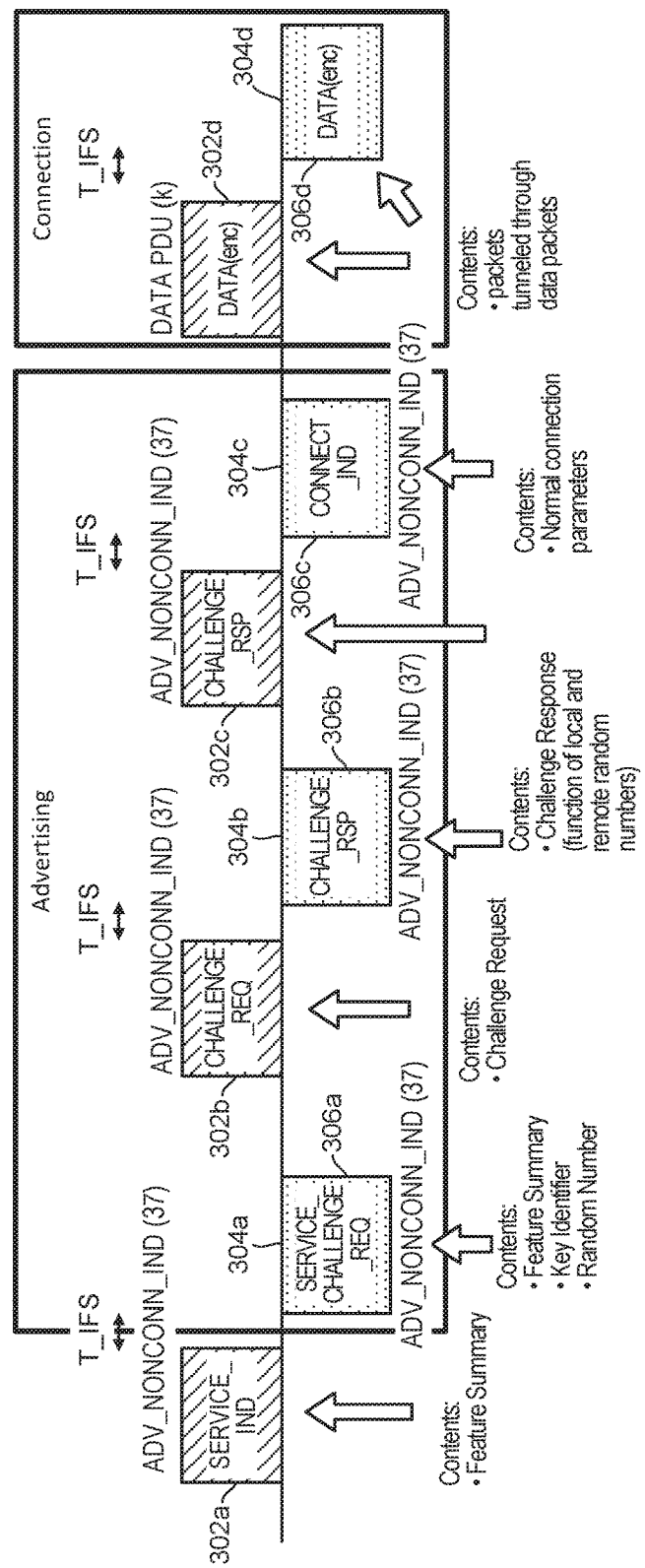

With reference to FIGS. 3A-D, aspects directed to the advertising establishment bearer will be described. As shown in FIG. 3A, a local device (e.g., phone 104) may send out one or more advertising packets, e.g., three advertising packets 302a-c at different frequencies and separated by a time instance (e.g., 10 ms between each of the advertising packets 302a-c), to advertise that the local device is available to establish a Bluetooth communication with a compatible device (also referred to as an advertising event). By definition, advertising packets 302a-c may be non-connectable, in the sense that no response from a remote device is normally expected. In conventional or typical implementations, a remote device which registers the advertisement may use the information to initiate a communication with the advertising host or local device in a separate and independent event. Specifically, a non-trusted remote device will not provide a response to the advertising event, and so by conventional norms, a period of silence may be expected in the time instances denoted by 304a-c following advertising packets 302a-c.

Specifically, as shown in FIG. 3B, at a time instance T_IFS (e.g., 150 micro seconds) following each of the advertising packets 302a-c, silence or no response would be expected for non-trusted remote device, and so the local device would not listen for a response at these time instances. In exemplary aspects, these periods of expected silence or no response are exploited to discover trusted remote devices. The local devices may listen for a response from trusted remote devices during time instances 304a-c, in exemplary aspects. Trusted remote devices may provide a response, or more specifically, initiate a sequence of communications at these time instances 304a-c, by which trust may be established as will be discussed further in FIG. 3C.

In FIG. 3C, an example sequence for establishing trust is illustrated, according to a specific protocol related to Bluetooth communication. To be clear, the illustrated sequence is merely by way of example to show that the expected periods of no response, i.e., 304a-c, to an advertising packet may be utilized for establishing trust with a remote device, and as such, any other sequence of one or more communication exchanges (e.g., one or more of challenge requests and responses) may occur in these expected periods 304a-c, to establish trust per different implementations and specifications. As illustrated in FIG. 3C, during the expected periods 304a-c in which the local device listens for messages from trusted remote devices per FIG. 3B, packets 306a-c are sent from a trusted remote device. Only a trusted remote device with a shared secret key or trusted hardware (e.g., based on advance programming at the same manufacturer for the local and remote devices) will know that packets 306a-c are to be sent at periods 304a-c in response to advertising packets 302a-c. Furthermore, when the first packet 306a is sent by the remote device in response to the first advertising packet 302a during period 304a, subsequent advertising packets 302b-c from the local device may be modified according to the sequence to establish trust, rather than follow conventional norms of sending advertising packets at different frequencies as per FIG. 3A. Further, an additional information exchange in the form of packet 302d sent from the local device and response packet 306d sent from the slave can also occur to complete the sequence. The sequence of messages will be explained further with reference to FIG. 3D below.

Figure 3D:
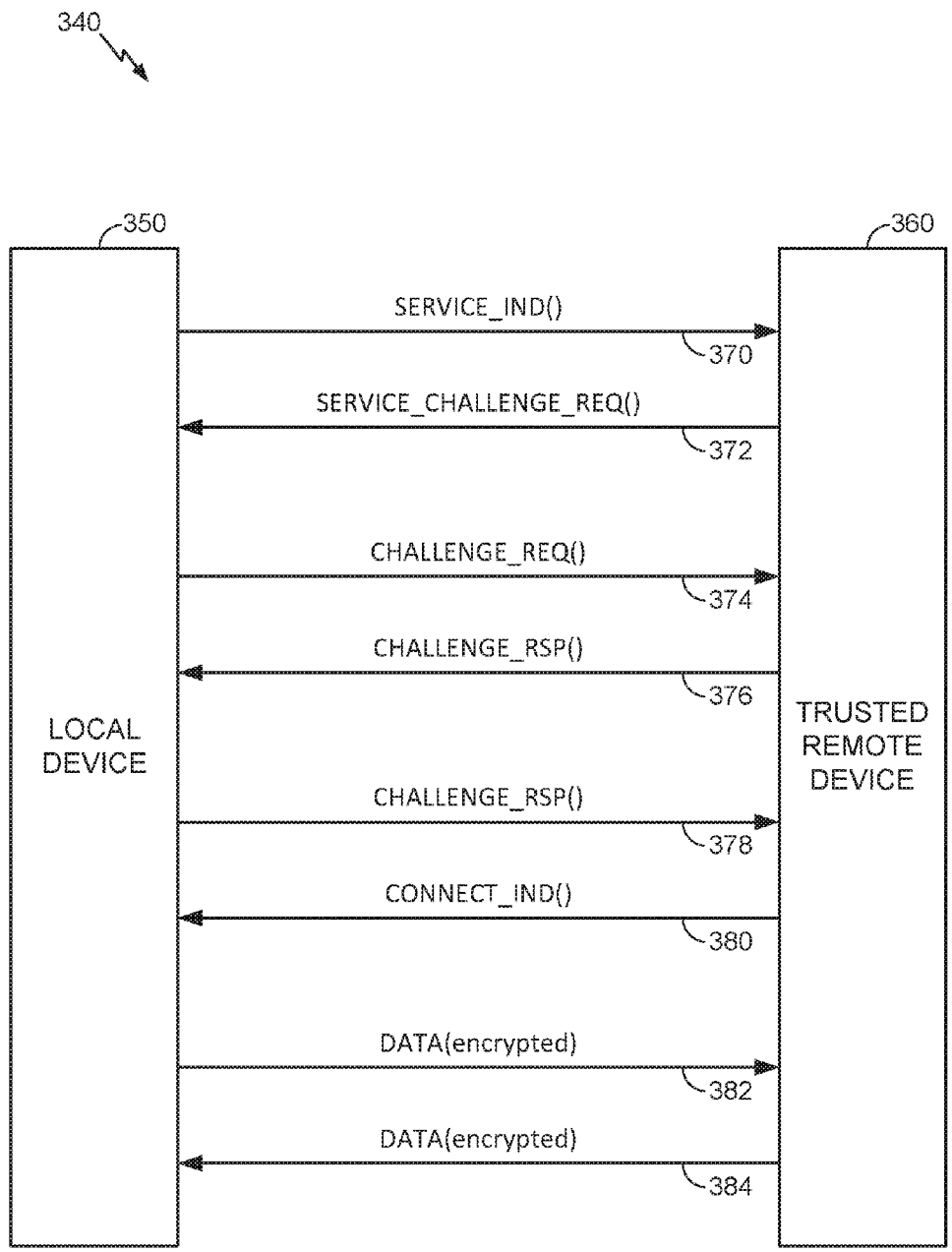

In FIG. 3D, local device 350 and trusted remote device 360 are shown as example devices between which trusted communication may be established using sequence 340 comprising steps 370-382, which will be explained in further detail, with combined reference to FIG. 3C.

In step 370, local device 350 may send a Service Indicator Protocol Descriptor Unit (PDU) or data packet in advertising packet 302a. For a trusted remote device, this acts as a trigger to respond, whereas a non-trusted remote device would not respond.

In step 372, trusted remote device 360 recognizes the Service Indicator PDU and responds with a Service Challenge Request PDU, e.g., in response packet 306a at time 304a, which may be a challenge request, such as a cryptographic random number, to verify that local device 350 is indeed a trusted remote device. A non-trusted remote device would not perform step 372 and therefore, local device 350 would not hear anything or have to listen in step 372 (e.g., at time 304a).

In step 374, after receiving the Service Challenge Request PDU in step 372, local device 350 sends its own Challenge Request, e.g., in advertising packet 302b, which may also be a challenge request, such as a cryptographic random number. The timing of sending packet 302b in step 374 may be relative to the Service Indicator PDU sent in step 372 from trusted remote device 360, in order to allow for sufficient time to calculate the response in step 374 from local device 350.

In step 376, trusted remote device 360 calculates and sends a response, e.g., in packet 306b, wherein the response is based on random numbers from both local device 350 (received in step 374) and the random number sent from trusted remote device 360 in step 372, as well as the Bluetooth addresses used in the corresponding packets 302b and 306a, respectively, and the data from the Service Indicator PDU in packet 302b.

In step 378, based on the response from trusted remote device 360 received in step 376, local device 350 may send a Challenge Response in packet 302c.

In step 380, a Connection Indicator PDU may be sent from trusted remote device 360 to local device 350, e.g., in packet 306c, which may be of format similar to n ADV_NONCONN_IND packet, i.e., that a response may not be required. Step 380 may be the last step in establishing trust In steps 382 and 384, local device 350 and trusted remote device 360 may both calculate respective session keys based on the Root keys and information exchanged, based on suitable algorithms for particular implementations and exchange corresponding packets 302d (from local device 350) and 306d (from trusted remote device 360), as shown in FIG. 3C.

The timing any of the above steps may be extended in order to provide sufficient time for local device 350 and trusted remote device 360, e.g., if they are integrated on lower speed processors. A response pending indication, e.g., a Challenge Response Pending PDU in step 378, or similar in any other step, may be provided to indicate that a response is forthcoming and thereby extend the timing of one or more steps of sequence 340.

Figure 4C:
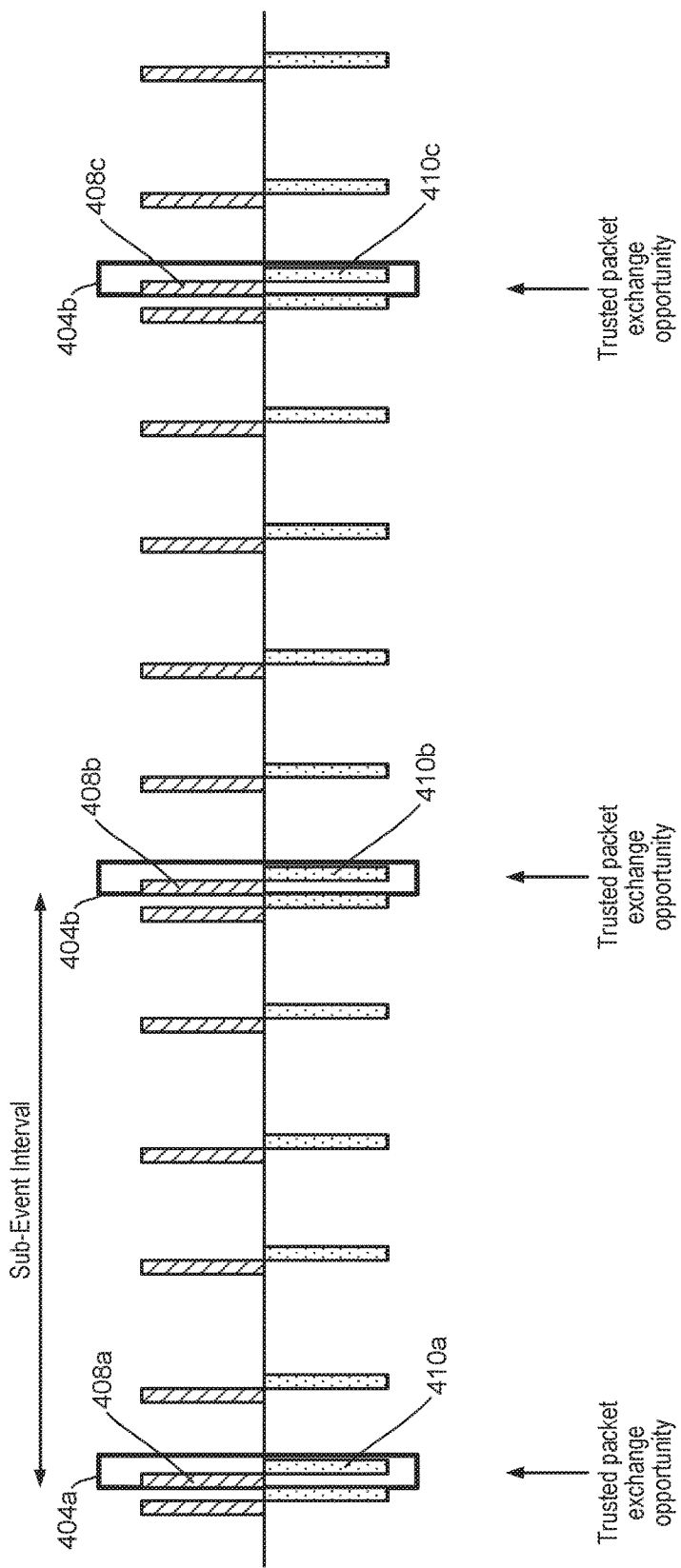

With reference to FIGS. 4A-C, aspects directed to the connection establishment bearer will be described. A connection establishment bearer may be used to overlay trusted communication messages or embed a side channel communication for trusted communication on an existing connection (e.g., Bluetooth connection) between a local device and a trusted remote device. In FIG. 4A, a typical Bluetooth communication protocol between any local device and remote device (not necessarily a trusted communication) is shown. In the typical scenario, the local device may send out packets such as 402a-c, the remote device may send response packets 406a-c, and in certain scenarios, periods 404a-404b represent time periods of silence in which no response or messages are expected to be sent or received on the communication channel. In more detail, packet 402a from the local device includes a message illustrated as "MD=1" to convey that more data (MD) is asserted to indicate that a data PDU is sent and the conversation is not complete. Similarly, response packet 406a from the remote device also includes an "MD=1" message to indicate that more messages are forthcoming. Packet 402b and response packet 406b, on the other hand include messages "MD=0" as a sign-off exchange to conclude the conversation from both ends, which indicates that the following time period 404a is expected to have silence from both the local device and the remote device. A similar exchange of "MD=0" is shown in packet 402c and response packet 406c, following which time period 404b is expected to have silence. More specifically, in exemplary aspects, non-trusted remote devices are not expected to communicate during time periods 404a-b.

In FIG. 4B, aspects of establishing trusted communication during time periods such as 404a-b of FIG. 4A are illustrated. Packet 402b from the local device and response packet 406b from the remote device as shown in FIG. 4A are reproduced in FIG. 4B. However, in time period 404a during which non-trusted remote devices will not communicate, a trusted remote device sub-event may be overlaid, e.g., with trusted packet 408a sent by the local device to a trusted remote device and trusted response packet 410a sent by a trusted remote device. The trusted-device sub event in time period 404a may occur a predetermined time (e.g., T_IFS=150 micro seconds) after a pair of MD=0 messages are exchange between a local device and a trusted remote device. Trusted packet 408a and trusted response packet 410a may constitute the beginning of a sequence of communications between a local device and a trusted remote device. For example, trusted packet 408a and trusted response packet 408b may form steps similar to steps 370 and 372, respectively, of a sequence similar to sequence 340 between local device 350 and trusted remote 360 as shown in FIG. 3D for the case of the advertising establishment barrier.

While the remaining steps 374-384 of a sequence similar to sequence 340 may follow with each pair of trusted communication messages exchanged between a local device and a trusted remote device occurring after each time period following a pair of MD=0 messages being exchanged, it is possible to overlay the steps at a lower frequency (e.g., once in every four or five instances following a pair of MD=0 message exchanges). A lower frequency or "sub rate" for the trusted remote device sub events may lead to lower power consumption, and so, the lower sub rate may be flexibly deployed based on desired power savings, without departing from the general principles of overlaying trusted communication during periods of expected silence between non-trusted remote devices. Accordingly, the trusted communication messages exchanged between a local device and a trusted remote device may be embedded in less than all the available one or more time periods (e.g., each time period following a pair of MD=0 messages being exchanged), to reduce a rate of the trusted communication For example, referring to FIG. 4C, periods 404a-c are illustrated as time periods which provide an opportunity to perform trusted packet exchanges, e.g., trusted packets 408a-c sent from a local device to a trusted remote device and trusted response packets 410a-c sent from the trusted remote device to the local device, respectively. If periods 404a-c represents all the opportunities for trusted packets available (e.g., each instance following an MD=0 exchange between the local device and the trusted remote device), then a subset of these opportunities may be employed for a trusted packet exchange or more generally, for a trusted communication to be performed, for cases where a sub rate is to be adopted for power savings purposes as noted above.

Figure 5:
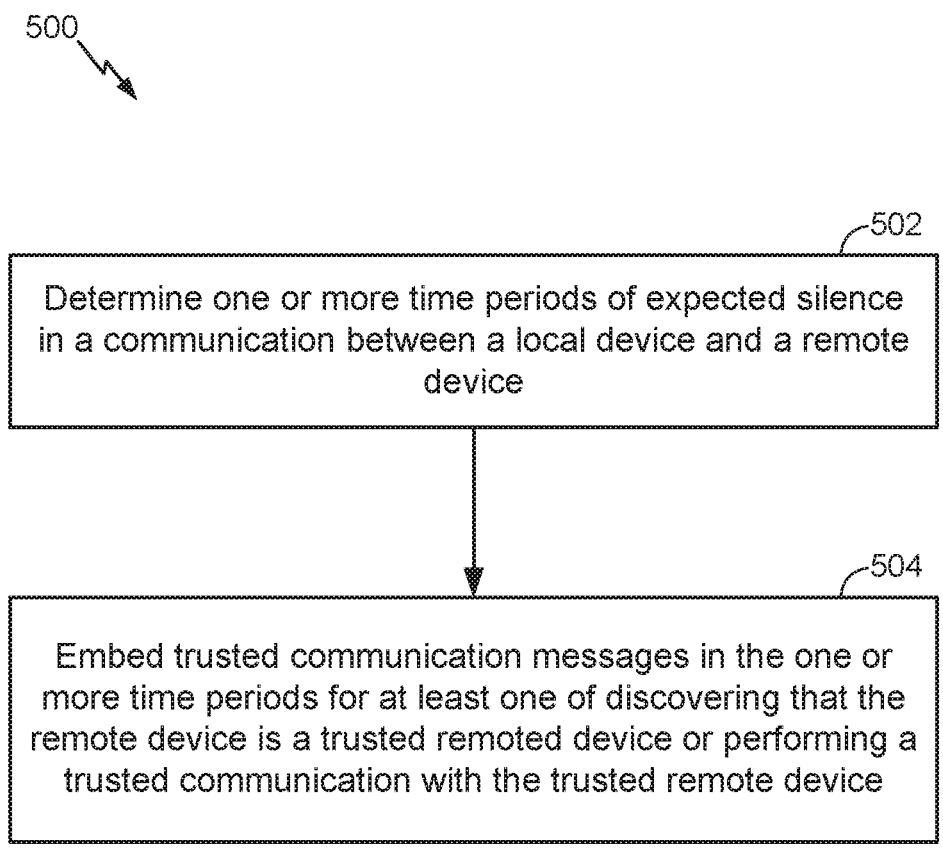
FIG. 5 illustrates a flowchart of a trusted communication method, according to an aspect of this disclosure.

Accordingly, it will be appreciated that exemplary aspects include various methods for performing the processes, functions and/or algorithms disclosed herein. For example, FIG. 5 illustrates a flowchart pertaining to trusted communication method 500. Block 502 comprises determining one or more time periods of expected silence in a communication between a local device and a remote device; and Block 504 comprises embedding trusted communication messages in the one or more time periods for at least one of: discovering that the remote device is a trusted remote device or performing a trusted communication with a trusted remote device.

Figure 6:
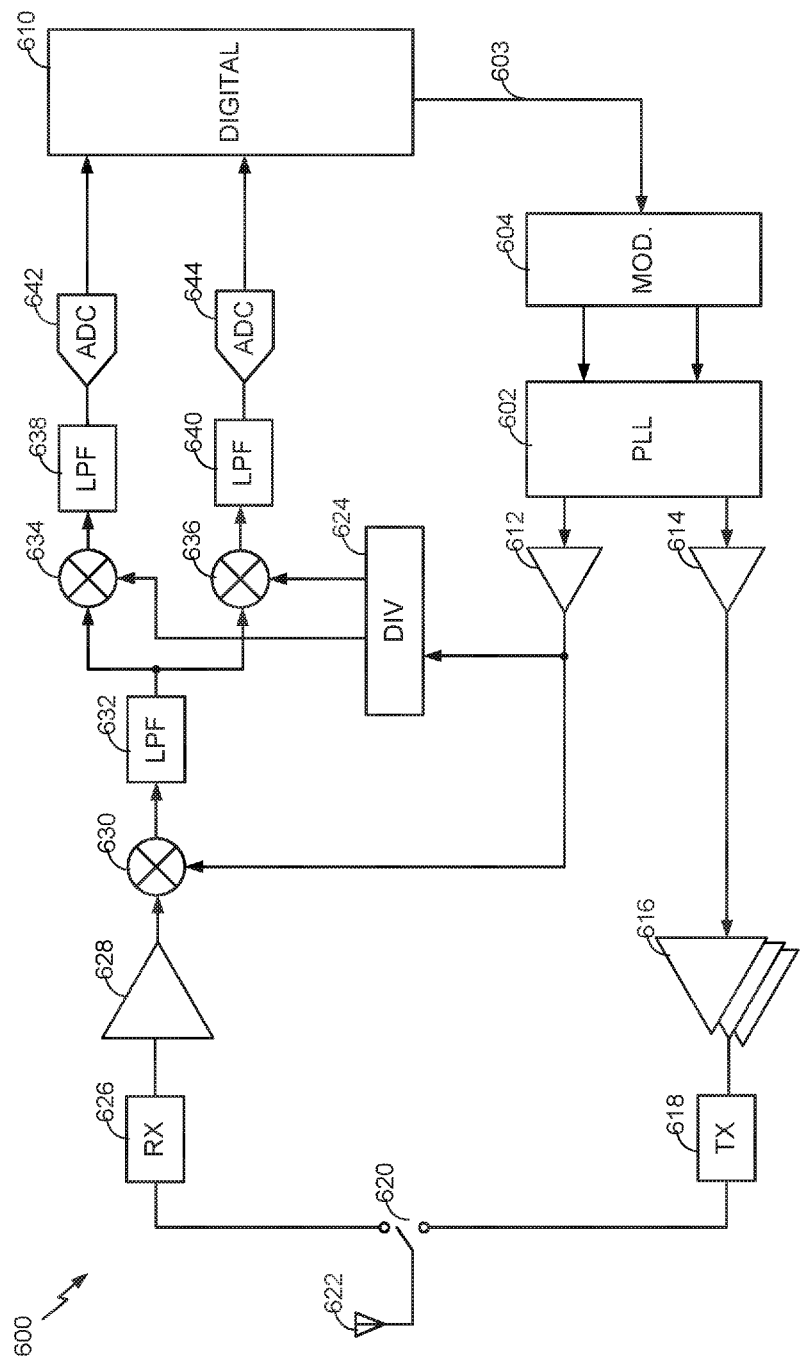
FIG. 6 illustrates an example wireless transceiver, according to aspects of the disclosure.

With reference now to FIG. 6 an example wireless transceiver 600 according to aspects of the disclosure is shown. The illustrated example of wireless transceiver 600 includes PLL 602, modulator 604, digital controller 610, buffers 612 and 614, transmit amplifiers 616, transmit matching network 618, transmit/receive switch 620, antenna 622, divider 624, receive matching network 626, front end amplifier 628, mixer 630, low pass filter 632, mixers 634 and 636, low pass filters 638 and 640, and analog-to-digital converters (ADCs) 642 and 644. In various aspects, a local device and a remote device, including a trusted remote device, may be generally be configured similar to wireless transceiver 600, e.g., for performing trusted communications.

Figure 7:
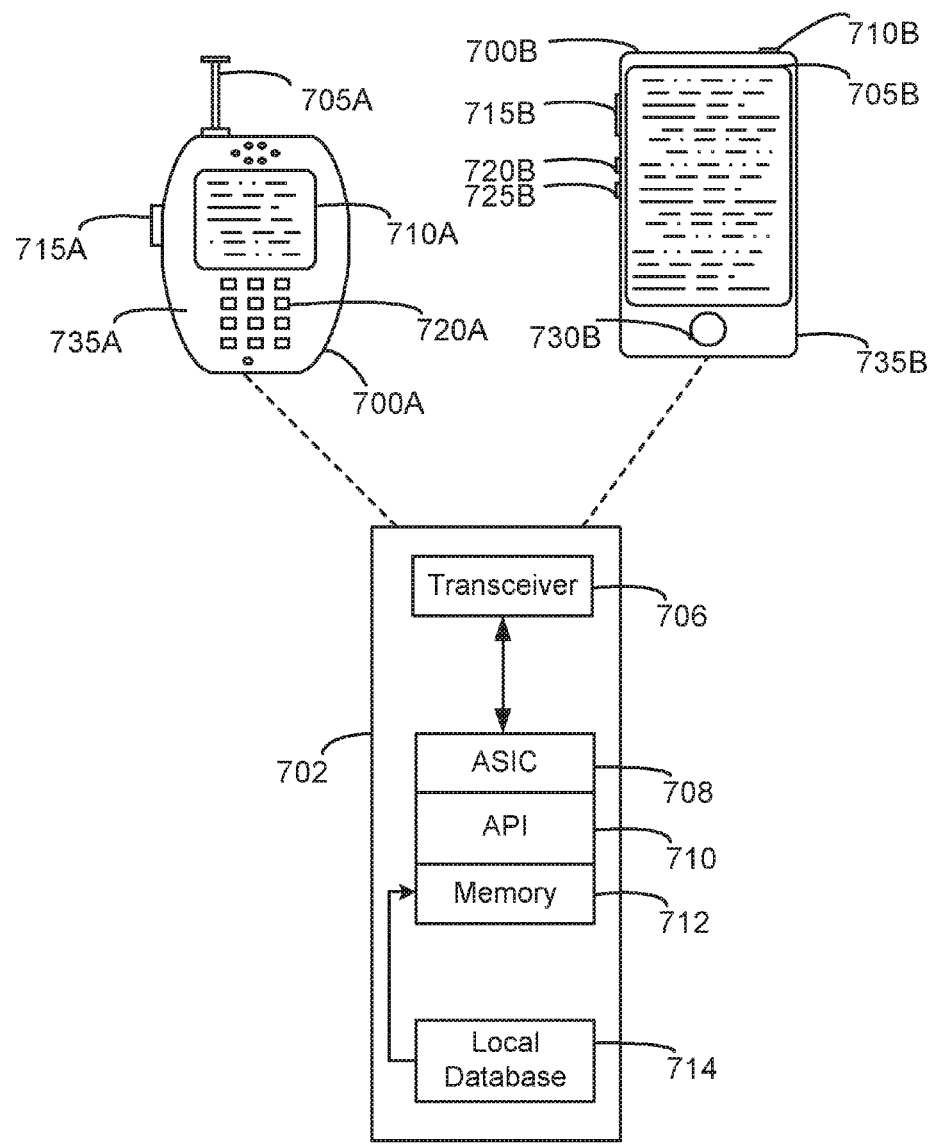
FIG. 7 illustrates example wireless devices, according to aspects of the disclosure.

With reference now to FIG. 7, example wireless devices 700A and 700B, according to aspects of the disclosure are illustrated. In some examples, wireless devices 700A and 700B may herein be referred to as wireless mobile stations. The example wireless device 700A is illustrated in FIG. 7 as a calling telephone (and may be a local device as discussed above) and wireless device 700B is illustrated as a touch-screen device (e.g., a smart phone, a tablet computer, which may be a remote device in some examples). As shown in FIG. 7, an exterior housing 735A of wireless device 700A is configured with antenna 705A, display 710A, at least one button 715A (e.g., a PTT button, a power button, a volume control button, etc.) and keypad 720A among other components, not shown in FIG. 7 for clarity. An exterior housing 735B of wireless device 700B is configured with touch-screen display 705B, peripheral buttons 710B, 715B, 720B and 725B (e.g., a power control button, a volume or vibrate control button, an airplane mode toggle button, etc.), at least one front-panel button 730B (e.g., a Home button, etc.), among other components, not shown in FIG. 7 for clarity. For example, while not shown explicitly as part of wireless device 700B, wireless device 700B may include one or more external antennas and/or one or more integrated antennas that are built into the exterior housing 735B of wireless device 700B, including but not limited to WiFi antennas, cellular antennas, satellite position system (SPS) antennas (e.g., global positioning system (GPS) antennas), and so on.

While internal components of wireless devices such as the wireless devices 700A and 700B can be embodied with different hardware configurations, a basic high-level configuration for internal hardware components is shown as platform 702 in FIG. 7. Platform 702 can receive and execute software applications, data and/or commands transmitted from a radio access network (RAN) that may ultimately come from a core network, the Internet and/or other remote servers and networks (e.g., an application server, web URLs, etc.). Platform 702 can also independently execute locally stored applications without RAN interaction. Platform 702 can include a transceiver 706 operably coupled to an application specific integrated circuit (ASIC) 708, or other processor, microprocessor, logic circuit, or other data processing device. ASIC 708 may include at least part of the exemplary functionality for embedding trusted communications in peer to peer communication with a trusted device. For example, ASIC 708 may include hardware subsystems (e.g., keys and related authentication mechanisms described in FIG. 1), which support the enhancements to the exemplary link layer. ASIC 708 or other processor executes an application programming interface (API) 710 layer that interfaces with any resident programs in a memory 712 of the electronic device. Memory 712 can be comprised of read-only or random-access memory (RAM and ROM), EEPROM, flash cards, or any memory common to computer platforms. Platform 702 also can include a local database 714 that can store applications not actively used in memory 712, as well as other data. Local database 714 is typically a flash memory cell, but can be any secondary storage device as known in the art, such as magnetic media, EEPROM, optical media, tape, soft or hard disk, or the like.

In one aspect, wireless communications by wireless devices 700A and 700B may be enabled by the transceiver 706 based on different technologies, such as CDMA, W-CDMA, time division multiple access (TDMA), frequency division multiple access (FDMA), Orthogonal Frequency Division Multiplexing (OFDM), GSM, 2G, 3G, 4G, LTE, or other protocols that may be used in a wireless communications network or a data communications network. Voice transmission and/or data can be transmitted to the electronic devices from a RAN using a variety of networks and configurations. Accordingly, the illustrations provided herein are not intended to limit the aspects of the invention and are merely to aid in the description of aspects of aspects of the invention.

Accordingly, aspects of the present disclosure can include a wireless device (e.g., wireless devices 700A, 700B, etc.) configured, and including the ability to perform the functions as described herein. For example, transceiver 706 may be implemented as wireless transceiver 600 of FIG. 6. As will be appreciated by those skilled in the art, the various logic elements can be embodied in discrete elements, software modules executed on a processor or any combination of software and hardware to achieve the functionality disclosed herein. For example, ASIC 708, memory 712, API 710 and local database 714 may all be used cooperatively to load, store and execute the various functions disclosed herein and thus the logic to perform these functions may be distributed over various elements. Alternatively, the functionality could be incorporated into one discrete component. Therefore, the features of the wireless devices 700A and 700B in FIG. 7 are to be considered merely illustrative and the invention is not limited to the illustrated features or arrangement.

Those of skill in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Further, those of skill in the art will appreciate that the various illustrative logical blocks, modules, circuits, and algorithm steps disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the claimed subject matter.

The methods, sequences and/or algorithms disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor.

Accordingly, aspects of the claimed subject matter may include a non-transitory computer-readable media embodying a method for adapting acquisition threshold to received signal strength of wireless signals such as Bluetooth or BLE. Accordingly, the claimed subject matter is not limited to illustrated examples.

While the foregoing disclosure shows illustrative aspects of the claimed subject matter, it should be noted that various changes and modifications could be made herein without departing from the scope of the claimed subject matter. The functions, steps and/or actions of the method claims in accordance with the description herein need not be performed in any particular order. Furthermore, although aspects of the claimed subject matter may be described or claimed in the singular, the plural is contemplated unless limitation to the singular is explicitly stated.

What is claimed is:

1. A method of performing trusted communications, the method comprising:
   determining, by a local device, one or more time periods of expected silence wherein no response is expected from a non-trusted remote device; and
   receiving, by the local device, trusted communication messages in at least one of the one or more time periods from a trusted remote device for establishing or continuing trusted communication between the local device and the trusted remote device.

2. The method of claim 1, wherein the one or more time periods follow one or more non-connectable advertising packets sent from the local device.

3. The method of claim 1, wherein the trusted communication messages comprise a sequence of one or more of challenge requests and responses and transfer of encrypted data based on a shared secret key between the local device and the trusted remote device.

4. The method of claim 1, wherein the one or more time periods follow one or more packet exchanges between the local device and a remote device, wherein the remote device is one of the non-trusted remote device or the remote device, the one or more packet exchanges to indicate that an existing conversation has ended.

5. The method of claim 4, wherein the one or more packet exchanges comprises messages transmitted from the local device and the remote device that indicate that there is no more data to be transmitted from the local device and the remote device, respectively.

6. The method of claim 4, comprising sending and receiving packets of the trusted communication messages in less than all available time periods of the one or more time periods, to reduce a rate of the trusted communication.

7. The method of claim 1, wherein the trusted communication is based on a Bluetooth protocol in a link layer.

8. The method of claim 1, wherein the trusted communication messages comprise one or more of firmware status updates to the trusted remote device, version checks on the trusted remote device, messages for quarantining at least portions of the trusted remote device affected by a malware, advertisements of Guest Access Services, authentications for enabling proprietary coder-decoder (codecs), discontinuous transmissions (DTX), or negotiations of master-slave roles.

9. A communication system comprising:
   a local device configured to:
      determine one or more time periods of expected silence wherein no response is expected from a non-trusted remote device; and
      receive trusted communication messages in at least one of the one or more time periods from a trusted remote device to establish or continue trusted communication between the local device and the trusted remote device.

10. The communication system of claim 9, wherein the one or more time periods follow one or more non-connectable advertising packets sent from the local device.

11. The communication system of claim 9, wherein the trusted communication messages comprise a sequence of one or more of challenge requests and responses and transfer of encrypted data based on a shared secret key between the local device and the trusted remote device.

12. The communication system of claim 9, wherein the one or more time periods follow one or more packet exchanges between the local device and a remote device, wherein the remote device is one of the non-trusted remote device or the remote device, the one or more packet exchanges to indicate that an existing conversation has ended.

13. The communication system of claim 12, wherein the one or more packet exchanges comprises messages transmitted from the local device and the remote device that indicate that there is no more data to be transmitted from the local device and the remote device, respectively.

14. The communication system of claim 12, wherein the local device is configured to send and receive packets of the trusted communication messages in less than all available time periods of the one or more time periods, to reduce a rate of the trusted communication.

15. The communication system of claim 9, wherein the trusted communication is based on a Bluetooth protocol in a link layer.

16. The communication system of claim 9, wherein the trusted communication messages comprise one or more of firmware status updates to the trusted remote device, version checks on the trusted remote device, messages for quarantining at least portions of the trusted remote device affected by a malware, advertisements of Guest Access Services, authentications for enabling proprietary coder-decoder (codecs), discontinuous transmissions (DTX), or negotiations of master-slave roles.

17. A communication system comprising:
   a local device, wherein the local device comprises:
      means for determining one or more time periods of expected silence wherein no response is expected from a non-trusted remote device; and
      means for receiving trusted communication messages in at least one of the one or more time periods from a trusted remote device for establishing or continuing trusted communication between the local device and the trusted remote device.

18. The communication system of claim 17, wherein the one or more time periods follow one or more non-connectable advertising packets sent from the local device.

19. The communication system of claim 17, wherein the trusted communication messages comprise a sequence of one or more of challenge requests and responses and transfer of encrypted data based on a shared secret key between the local device and the trusted remote device.

20. The communication system of claim 17, wherein the one or more time periods follow one or more packet exchanges between the local device and a remote device, wherein the remote device is one of the non-trusted remote device or the remote device, the one or more packet exchanges to indicate that an existing conversation has ended.

21. The communication system of claim 20, wherein the one or more packet exchanges comprises messages transmitted from the local device and the remote device that indicate that there is no more data to be transmitted from the local device and the remote device, respectively.

22. The communication system of claim 20, wherein the local device comprises means for sending and receiving packets of the trusted communication messages in less than all available one or more time periods, to reduce a rate of the trusted communication.

23. The communication system of claim 17, wherein the trusted communication is based on a Bluetooth protocol in a link layer.

24. The communication system of claim 17, wherein the trusted communication messages comprise one or more of firmware status updates to the trusted remote device, version checks on the trusted remote device, messages for quarantining at least portions of the trusted remote device affected by a malware, advertisements of Guest Access Services, authentications for enabling proprietary coder-decoder (codecs), discontinuous transmissions (DTX), or negotiations of master-slave roles.

\* \* \* \* \*